United States Patent
Samra et al.

(10) Patent No.: US 8,219,836 B2
(45) Date of Patent: *Jul. 10, 2012

(54) METHODS AND APPARATUS TO MONITOR INSTRUCTION TYPES AND CONTROL POWER CONSUMPTION WITHIN A PROCESSOR

(75) Inventors: Nicholas G. Samra, Austin, TX (US);
Andrew S. Huang, Austin, TX (US);
Namratha R. Jaisimha, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 621 days.

This patent is subject to a terminal disclaimer.

(21) Appl. No.: 11/759,776

(22) Filed: Jun. 7, 2007

(65) Prior Publication Data

US 2007/0234094 A1    Oct. 4, 2007

Related U.S. Application Data

(63) Continuation of application No. 10/744,719, filed on Dec. 23, 2003, now Pat. No. 7,246,219.

(51) Int. Cl.
   *G06F 1/32*    (2006.01)
(52) U.S. Cl. ...................................... 713/320
(58) Field of Classification Search .................. None
   See application file for complete search history.

(56) References Cited

U.S. PATENT DOCUMENTS

| | | | |
|---|---|---|---|
| 5,815,724 A | | 9/1998 | Mates |
| 5,951,689 A | * | 9/1999 | Evoy et al. ................ 713/322 |
| 5,987,595 A | | 11/1999 | Yoaz et al. |
| 5,996,083 A | * | 11/1999 | Gupta et al. ................ 713/322 |
| 6,219,796 B1 | * | 4/2001 | Bartley ........................ 713/320 |
| 6,795,930 B1 | * | 9/2004 | Laurenti et al. ............... 713/324 |
| 6,839,828 B2 | * | 1/2005 | Gschwind et al. .............. 712/20 |
| 6,983,389 B1 | * | 1/2006 | Filippo ........................ 713/324 |
| 2003/0131269 A1 | | 7/2003 | Mizyuabu et al. |

OTHER PUBLICATIONS

Intel Corporation, P6 Family of Processors: Hardware Developer's Manual, online, http://www.intel.com/design/PentiumII/manuals/244001.htm, Chs. 1-2 (9 pages) (Sep. 1998).

MicroProcessor Architectures 7, online, http://www.ee.surrey.ac.uk/Teaching/Courses/msccomp/notes/comparch7.html, entire document (6 pages) (Oct. 9, 2003).

Intel Corporation, IA-32 Intel Architecture Software Developer's Manual: Basic Architecture, vol. 1, online, http://www.intel.com/design/Pentium4/manuals/24547012.pdf, 426 pages, downloaded from the Internet on Oct. 7, 2003.

Intel Corporation, IA-32 Intel Architecture Software Developer's Manual: Instruction Set Reference, vol. 2, online, http://www.intel.com/design/Pentium4/manuals/24547112.pdf, 978 pages, downloaded from the Internet on Oct. 10, 2003.

(Continued)

*Primary Examiner* — Jacob A Petranek
(74) *Attorney, Agent, or Firm* — Blakely, Sokoloff, Taylor & Zafman LLP

(57) ABSTRACT

Methods and apparatus are disclosed to control power consumption within a processor. An example apparatus disclosed herein includes logic to identify at least one instruction type and to initialize a counter value corresponding to a maximum number of instructions to be performed, the maximum number being at least partially dependent upon the identified at least one instruction type. The example apparatus also includes processing logic to be enabled or disabled based, at least in part, on the counter value.

15 Claims, 10 Drawing Sheets

OTHER PUBLICATIONS

Intel Corporation, IA-32 Intel Architecture Optimization: Reference Manual, online, http://www.intel.com/design/Pentium4/manuals/ 24896609.pdf, 470 pages, downloaded from the Internet on Oct. 9, 2003.

* cited by examiner

FIG. 5

EXAMPLE OF INSTRUCTION CLASSIFICATION AND TSM OPERATION

| INSTRUCTION | TYPE | FLOATING PT. CLASSIFIER OUTPUT | TRACKING COUNTER VALUE | FLOATING PT. ENABLE OUTPUT |
|---|---|---|---|---|
| MOV | DATA XFER | FALSE | 0 | OFF |
| FADD | FLOATING PT. | TRUE | 4 | ON |
| MOV | DATA XFER | FALSE | 3 | ON |
| FMUL | FLOATING PT. | TRUE | 4 | ON |
| MOV | DATA XFER | FALSE | 3 | ON |
| ADD | INTEGER | FALSE | 2 | ON |
| MOV | DATA XFER | FALSE | 1 | ON |
| SUB | INTEGER | FALSE | 0 | OFF |
| MOV | DATA XFER | FALSE | 0 | OFF |
| ADD | INTEGER | FALSE | 0 | OFF |
| FDIV | FLOATING PT. | TRUE | 4 | ON |

⟶ TIME ⟶

ASSUMPTIONS:
INSTRUCTION TYPES: DATA XFER, INTEGER, FLOATING POINT
PROCESSOR SIZE: 4 INSTRUCTIONS

FIG. 7

METHODS AND APPARATUS TO MONITOR INSTRUCTION TYPES AND CONTROL POWER CONSUMPTION WITHIN A PROCESSOR

RELATED APPLICATION

This patent arises from a continuation of U.S. patent application Ser. No. 10/744,719, which was filed on Dec. 23, 2003 and which is hereby incorporated by reference in its entirety.

FIELD OF THE DISCLOSURE

This disclosure relates generally to processors, and, more particularly, to methods and apparatus to control power consumption within a processor.

BACKGROUND

Power consumption is a major concern in modern electronics and processor-based devices. In recent years, the use of laptop and notebook computers for mobile computing has become commonplace. Also, personal digital assistants, or PDAs, are becoming a standard accessory for the busy professional. Moreover, many of today's mobile, cellular telephones include PDA functionality as a standard feature so that the user can access email, play computer games, or access the internet while on the move. In all of these examples, the electronic device relies on a finite power source, such as a battery. Thus, reducing power consumption, and thereby increasing battery life, is an important factor in fielding a product that is attractive to the market, and thus economically profitable.

One approach to reduce power consumption in a processor-based device is to reduce the current consumption of the processor. A common technique is to disable unused functional blocks within the processor based on the operation or set of operations being performed at a given time. Furthermore, the procedure for enabling and disabling functional blocks is inherently dynamic, as the blocks should be enabled so as not to introduce any processing latency, and yet be disabled quickly to minimize excess current use.

One of the most common techniques to enable and disable functional blocks is through "clock gating." A "clock enable" signal can be used to "gate" a functional block's input clock to be in either an ON state or an OFF state. From a Boolean logic perspective, the clock enable can be viewed as being either a logic-1 or logic-0 that is ANDed with the clock input. If the clock enable is set to logic-1 (enable), then the value of the clock input passes unimpeded to the functional block. If the clock enable is set to logic-0 (disable), then the value of the clock input is forced to logic-0 as well, and is not able to clock any of the gates residing within the corresponding functional block.

Typically, as seen in the art, the clock enable for a particular functional block is generated by the functional block or blocks preceding it in the processing stream, or "pipeline." This sequential approach attempts to provide the dynamic switching needed to reduce power consumption without introducing processing latency, as described above. However, because the clock enable for a given functional block is often generated by the preceding "upstream" functional block, the timing of the clock enable becomes a critical design constraint. For example, due to setup and hold time requirements, the upstream block may need to determine, or predict, whether or not a downstream block needs to be enabled before the time that the downstream block is to actually begin processing. If the upstream block decides in error, the downstream block may be enabled unnecessarily, thereby increasing the current consumption of the processor. Or, if there is a delay between the upstream block generating the enable and the time the downstream block needs to be activated, a processing latency can result that will impact the efficiency and speed of the processor, or worse, cause the processor to operate in an erroneous manner.

In some circumstances, an upstream block may itself be disabled when a downstream block is to be enabled. For example, if there are feedback loops in the hardware architecture, it may be that the upstream block must be re-enabled so as to enable the downstream block even if the upstream block does not need to perform any processing. In these cases, the common sequential clock enable circuitry usually must be augmented by potentially more complex circuitry to effectively enable and disable blocks that exist along the feedback path.

BRIEF DESCRIPTION OF THE DRAWINGS

FIG. 5 is a more detailed illustration of the example type decoder of FIG. 4.

FIG. 7 depicts an example operation of the example instruction classifier and the example tracking state machine of FIG. 2.

DETAILED DESCRIPTION

As mentioned previously, power consumption is an important consideration in the design of modern processors. However, the existing methods of reducing power consumption by reducing current consumption have many limitations as described above. Moreover, due to the ever increasing complexity of modern processors, the existing methods are not readily scalable, and hence, may not even be feasible to implement within a desired footprint and/or cost target.

Figure 1:
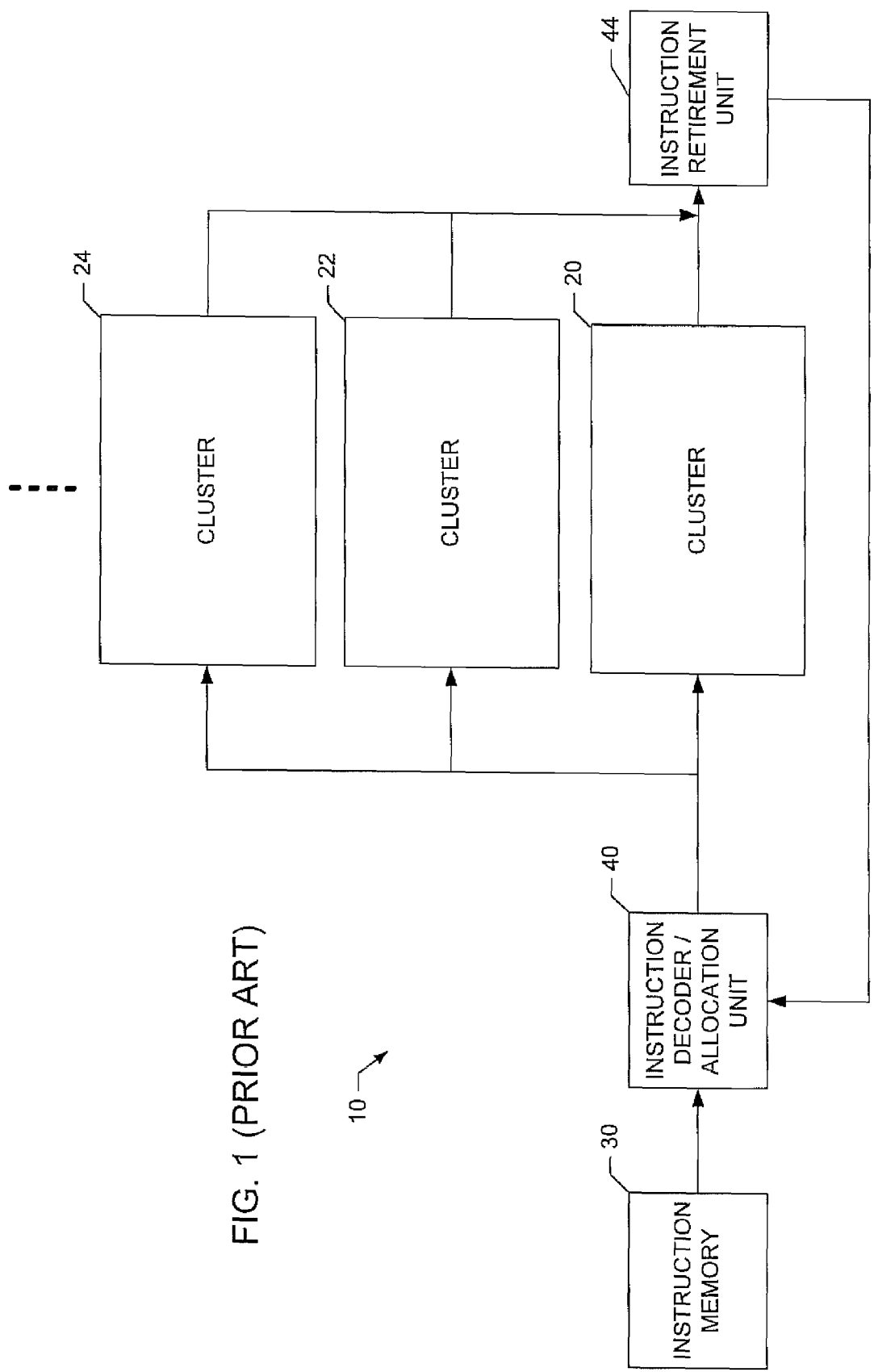
FIG. 1 is a schematic illustration of a prior art processor with multiple clusters of functional blocks.

To illustrate this complexity, an example prior art processor 10 is shown in FIG. 1. The example processor 10 in FIG. 1 comprises multiple clusters 20, 22, 24 of functional blocks to process instructions contained in an instruction memory 30. The multiple clusters 20, 22, 24 are provided to allow execution of multiple instructions in parallel. In addition, the clusters 20, 22, 24 can be implemented so that the execution of an instruction is divided into various stages, known as pipeline processing. Thus, the multiple clusters 20, 22, 24 can be configured to allow for multiple, overlapping pipelines to increase overall instruction execution speed.

To read an instruction from memory 30 and prepare it for processing, the example processor 10 in FIG. 1 includes an instruction decoder and allocation unit 40. The instruction decoder and allocation unit 40 reads an instruction from memory 30 and decodes the instruction into a form that can be processed by the clusters 20, 22, 24. Once a cluster 20, 22, 24 becomes available, the instruction decoder and allocation unit 40 allocates the instruction to an instruction retirement unit 44 and to the available cluster for processing.

Because multiple instructions may be processed in parallel, the results of one or more of the instructions may be erroneous due to data dependency violations, control flow violations, speculation violations, and the like. For example, to maintain peak efficiency, the instruction decoder and allocation unit 40 may continue to read an instruction from memory 30 and allocate it to the instruction retirement unit 44 and to a cluster 20, 22, 24 even if the instruction depends on the results from a preceding instruction that has not finished execution. As a result, the new instruction may operate on erroneous data, therefore producing an erroneous result. This is an example of a data dependency violation. Similarly, a control flow violation may occur if the results from a preceding instruction determine whether or not a new instruction read from memory 30 should be executed.

To resolve these violations, the example processor 10 includes the instruction retirement unit 44 mentioned previously. The instruction retirement unit 44 tracks the status of the instruction being processed and determines the validity of its results after execution completes. If the results are valid, the instruction retirement unit 44 indicates that the results can be committed to the program execution flow and then retires the instruction (e.g., the instruction is removed or "exited" from the processor 10). If the results are invalid, the retirement unit 44 signals the instruction decoder and allocation unit 40 that the instruction is to be re-executed to recover from the violation. As may be recognized by one having ordinary skill in the art, because the instruction retirement unit 44 tracks each instruction being executed by the processor 10, the maximum number of instructions that can be tracked by the instruction retirement unit 44 limits the number of instructions that the processor 10 can process at any given time. Moreover, if the instruction retirement unit 44 has resources available to track an instruction, then the instruction may be allocated to a cluster 20, 22, 24 by the instruction decoder and allocation unit 40 if the appropriate functional blocks are available.

As can be seen in the example processor 10 of FIG. 1, the instruction may be executed along multiple processing paths. As a result, traditional approaches of controlling power consumption are likely to result in complex implementations, as the upstream blocks would need to be sophisticated enough to be aware of the various possible processing paths, and thereby enable and disable the proper functional blocks in the appropriate processing chain. Also, it is apparent that the traditional approaches are not readily scalable. For example, the addition of another cluster would likely result in the need to redesign many blocks to account for the need to enable and disable the component blocks in the new cluster. Moreover, the processor layout, and therefore timing characteristics, would change as a result of the new cluster. This latter change could prove especially troublesome as it could result in a need to change the power control logic for the existing clusters 20, 22, 24 as well.

Figure 2:
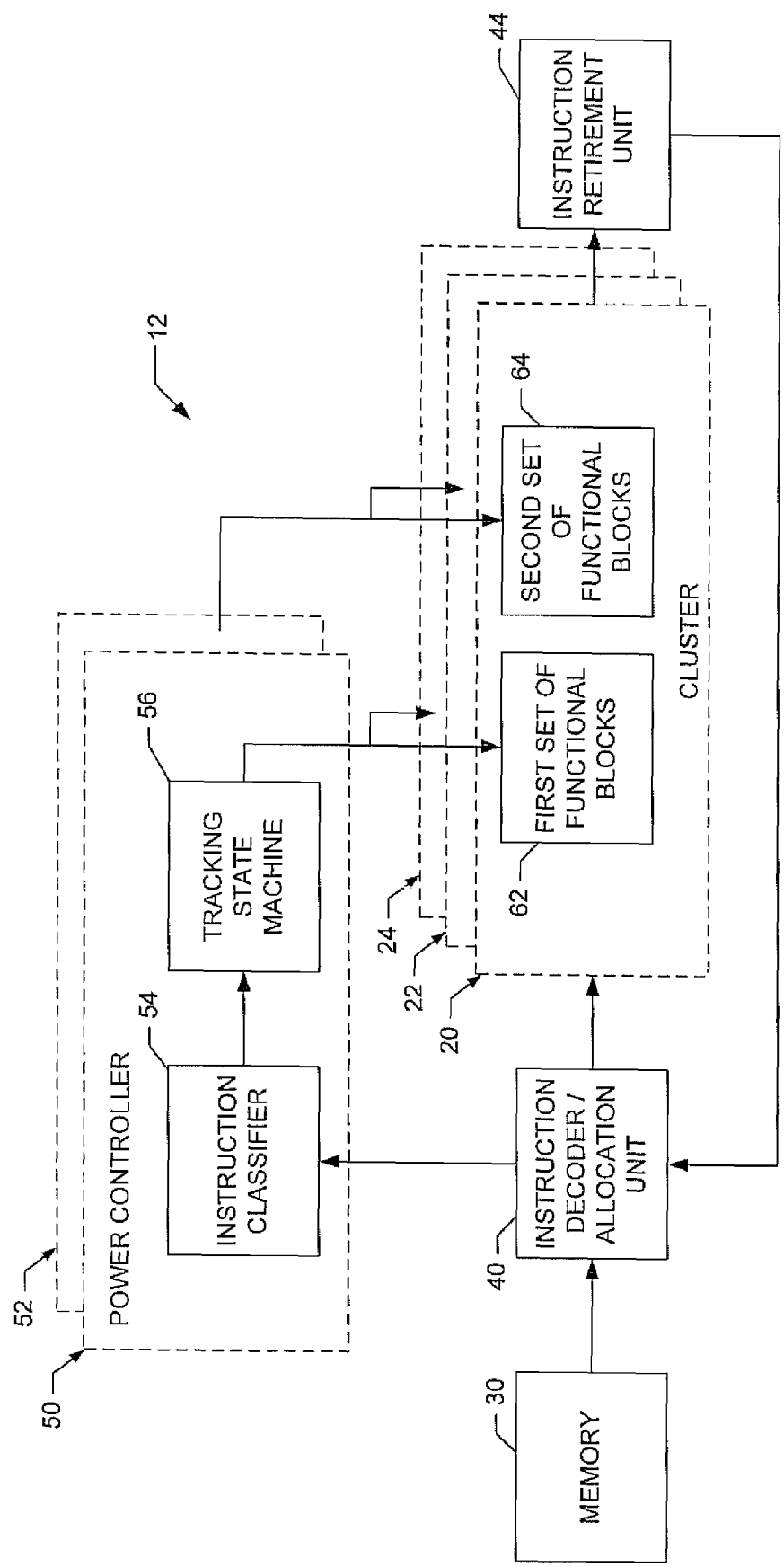
FIG. 2 is a schematic illustration of an example processor that includes an example power controller to enable and disable functional blocks within the example processor.

FIG. 2 provides a schematic illustration of an example power controller 50 to control power consumption in an example processor 12. The example processor 12 is similar to the example processor 10 of FIG. 1 discussed previously, but with the addition of one or more power controllers 50, 52 described herein. In the interest of brevity, identical blocks appearing in both FIGS. 1 and 2 will not be re-described here. Instead, the interested reader is referred to the above description of FIG. 1. To assist the reader in the process, substantially identical blocks are labeled with identical reference numerals in the figures.

To support efficient power consumption, the cluster 20 of FIG. 2 may be divided into sets of functional blocks that process specific types of instructions. For example, the cluster 20 in processor 12 may be divided into a first set of functional blocks 62 that processes a first type of instruction, and a second set of functional blocks 64 that processes a second type of instruction. Examples of common instruction types include integer instructions and floating-point instructions.

To enable and disable the different sets of functional blocks, one or more power controllers 50, 52 are included in the example processor 12. In this example, power controller 50 is configured so as to enable and disable the first set of functional blocks 62 in cluster 20. Similarly, power controller 52 is configured so as to enable and disable the second set of functional blocks 64. One having ordinary skill in the art will appreciate that many configurations are possible, such as one power controller 50 being responsible for controlling multiple sets of functional blocks, or each cluster 20, 22, 24 having its own dedicated power controller or set of power controllers. In the example processor 12, however, the clusters 20, 22, 24 are implemented such that a first subset of clusters comprises similar first sets of functional blocks 62 and a second subset of clusters comprises similar second sets of functional blocks 64. Thus, power controller 50 can be used to enable and disable the similar first sets of functional blocks in the first subset of clusters. Similarly, power controller 52 can be used to enable and disable the similar second sets of functional blocks in the second subset of clusters. As one having ordinary skill in the art will understand, the choice of implementation depends on the specific processor, and is usually a function of, for example, the power controller overhead relative to the overall processor size, the number of different sets of functional blocks, the distribution of sets of functional blocks between the various clusters, and the desired granularity of power control.

To determine whether or not a specific set of functional blocks should be enabled or disabled, the power controller 50 contains an instruction classifier 54. In the example processor 12, the instruction classifier 54 classifies the instruction allocated to the instruction retirement unit 44 by the instruction decoder and allocation unit 40 into a first type of instruction or a second type of instruction. In this example, the first set of functional blocks 62 processes instructions of the first type, and the second set of functional blocks 64 processes instructions of the second type. Thus, by classifying the instructions as being either of the first type or second type, the instruction classifier 54 determines which set of functional blocks 62, 64 should be enabled.

The example power controller 50 also includes a tracking state machine 56 coupled with the instruction classifier 54. As described below, the tracking state machine 56 generates the control signal or signals to enable and disable the appropriate set of functional blocks.

One having ordinary skill in the art will recognize that this example processor 12 can be extended to support more than two instruction types and/or more than two sets of functional blocks.

Figure 3:
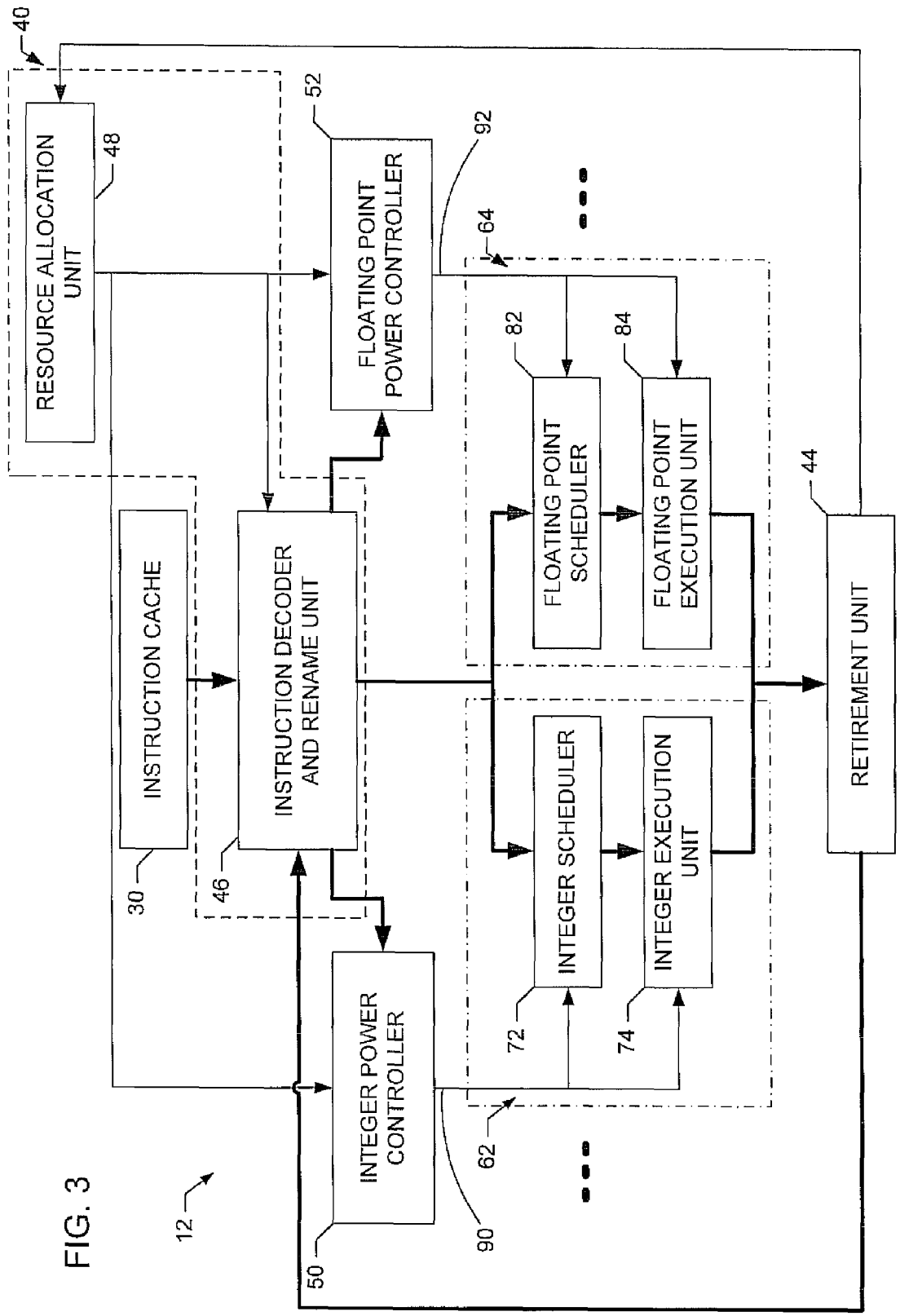
FIG. 3 is a more detailed illustration of the example processor and the example power controller of FIG. 2.

To further illustrate the operation of the example power controller 50, a more detailed illustration of the example processor 12 is shown in FIG. 3. In the example processor 12, the first set of functional blocks 62 process integer type instructions. Thus, the first set 62 comprises an integer scheduler 72 to schedule the processing of an integer instruction and an integer execution unit 74 to execute the integer instruction. The second set of functional blocks 64 process floating-point type instructions. Thus, the second set 64 comprises a floating-point scheduler 82 to schedule the processing of the floating-point instruction and a floating-point execution unit 84 to execute the floating-point instruction.

Also, in the example processor 12, the instruction decoder and allocation unit 40 is shown to comprise an instruction decoder and rename unit 46 and a resource allocation unit 48. The instruction decoder and rename unit 46 reads the instruction from memory 30 (possibly implemented as an instruction cache 30) and decodes the instruction for processing by the cluster 20. For example, the decoding process may involve parsing the instruction into one or more opcodes and determining registers and/or memory locations to be used in the execution of the instruction. Furthermore, the instruction decoder and rename unit 46 may rename elements of the instruction, e.g., remap registers, so that multiple instructions that access the same elements can be executed in parallel without contention for these same elements.

The resource allocation unit 48 determines if the cluster 20 is available to process an instruction. The resource allocation unit 48 makes this determination based on control information received from the retirement unit 44 that indicates whether the instruction retirement unit 44 has resources available to track a new instruction of the appropriate type. If the instruction retirement unit 44 indicates that resources are available, the resource allocation unit 48 will allocate the instruction read by the instruction decoder and rename unit 48 to the instruction retirement unit 44 and the appropriate cluster 20. The resource allocation unit 48 also sends control information to the power controllers 50, 52 that indicates when a new instruction has been allocated for processing. The use of this control information is described in greater detail below.

For the example processor 12 in FIG. 3, the integer functional blocks 72, 74 are enabled and disabled by the integer power controller 50. The floating-point functional blocks 82, 84 are enabled by the floating-point controller 52. The functional blocks 72, 74, 82, 84 are enabled and disabled through the use of clock control signals that gate the input clocks for the functional blocks to be in either an ON state or an OFF state. In this example, the integer power controller 50 generates a single control signal 90 that controls the clock inputs for the integer scheduler 72 and integer execution unit 74. The floating-point power controller 52 generates a single control signal 92 that controls the clock inputs for the floating-point scheduler 82 and floating-point execution unit 84. One having ordinary skill in the art will recognize that another example processor could be architected such that the power controllers 50, 52 generate separate clock control signals for each functional block, or a combination of groups of the functional blocks.

Figure 4:
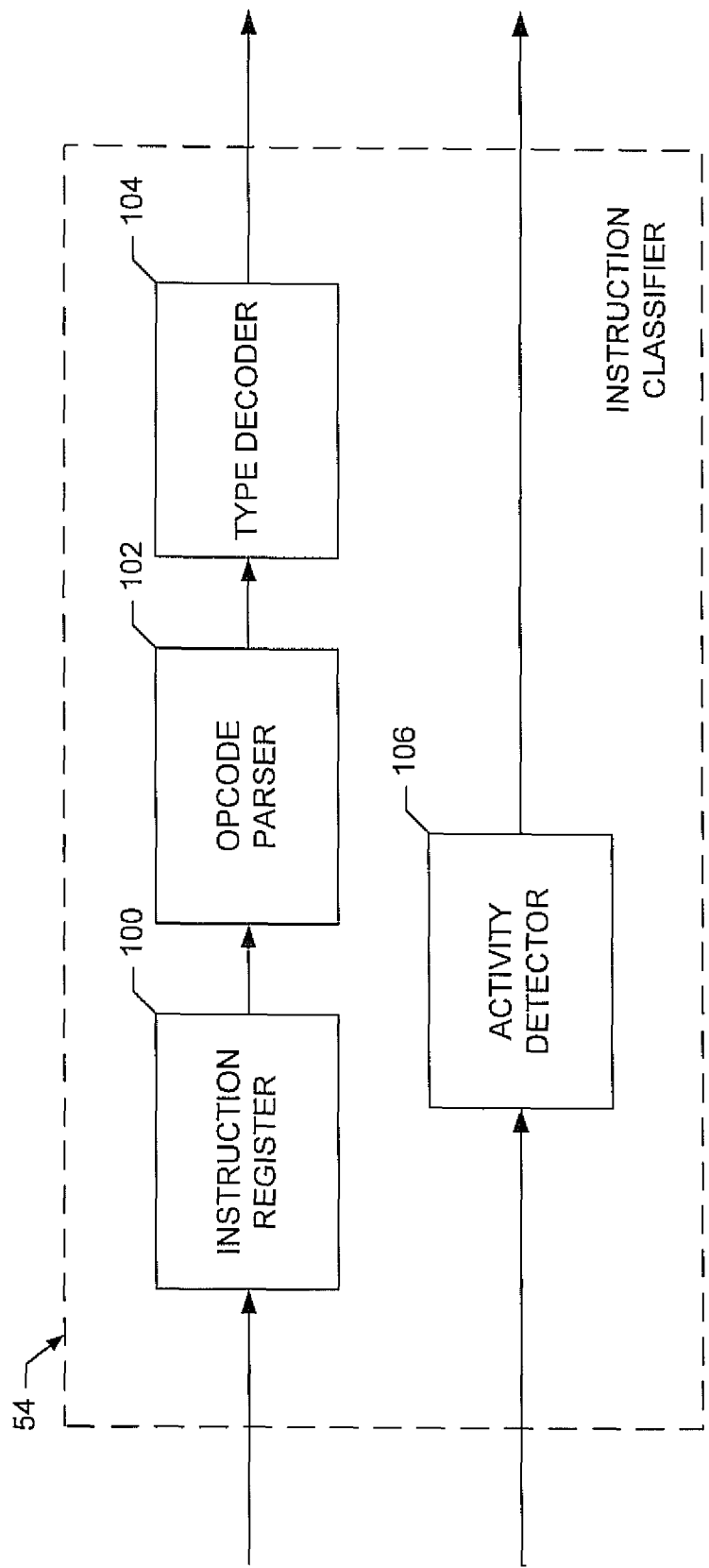
FIG. 4 is a more detailed illustration of the example instruction classifier of FIG. 2.

To better understand the operation of the instruction classifier 54 of FIG. 2, consider the more detailed schematic illustration of an example instruction classifier 54 as shown in FIG. 4. In this example, the instruction classifier 54 comprises an instruction register 100 to provide temporary storage for the new instruction to processed, and an opcode parser 102 to determine the opcode component(s) of the instruction. An opcode parser 102 is useful for those instructions sets in which instruction types are defined based on the instruction opcodes. However, one having ordinary skill in the art will note that the functionality of the instruction register 100 and the opcode parser 102 could also be integrated into the instruction decoder and rename unit 46 of FIG. 3 to yield a potentially more efficient overall design.

To determine the type of the instruction to be processed, the example instruction classifier 54 of FIG. 2 also comprises a type decoder 104. The output of the type decoder 104 is a signal or value representative of the instruction type. For example, this output could be set to a logic TRUE value if the instruction belongs to a given type of interest, and set to a logic FALSE value if the instruction is not of this type. Such an implementation is useful for power controllers 50, 52 designed to control one set of functional blocks that operate on a single instruction type. In another example, the output of the type decoder 104 could be multi-valued, with each defined instruction type or group of types represented by a unique value. This implementation is useful for power controllers 50, 52 designed to control more than one set of functional blocks that operate on more than one instruction types.

The example instruction classifier 54 also contains an activity detector 106. In this example, the activity detector 106 receives a control signal from the resource allocation unit 48 that indicates that a new instruction has been allocated to the instruction retirement unit 44 and, therefore, has been allocated to one of the clusters for processing, for example, cluster 20. The activity detector 106 then generates an output to indicate that the instruction has been classified by the type decoder 104 and the power controller 50, 52 can begin generating the appropriate clock control signal(s). One having ordinary skill in the art will note that the activity detector 106 could be replaced by, for example, a trigger generated by the instruction retirement unit 44 that indicates the instruction has been allocated for processing and, therefore, that the output of the type decoder 104 is valid.

Figure 5:
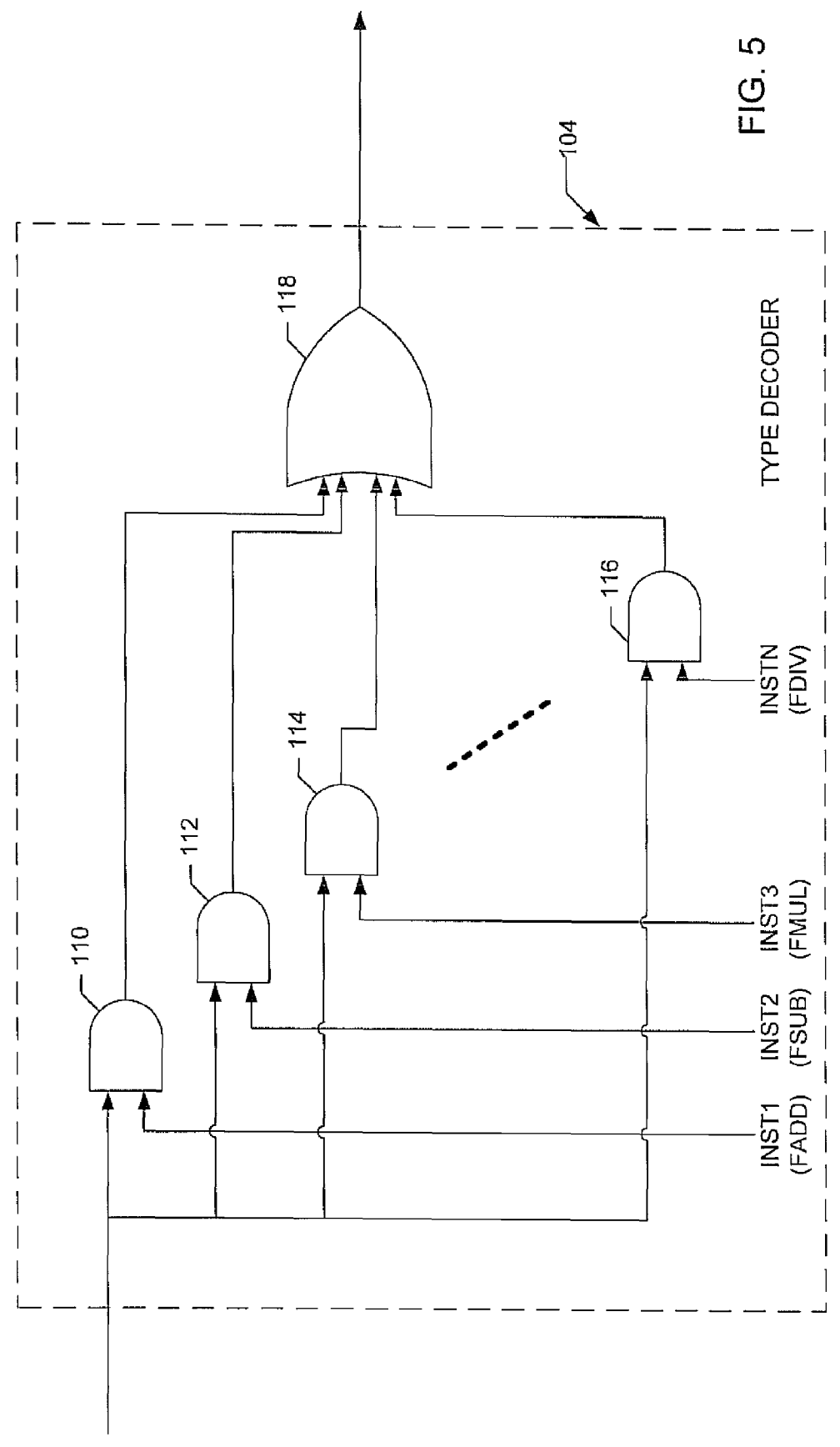

FIG. 5 provides an illustration of an example type decoder 104. This example type decoder 104 generates a logic TRUE value at its output if the instruction is of the floating-point type, and a logic FALSE value if the instruction is not of the floating-point type. To generate this value, the example type decoder 104 compares the incoming instruction opcode to the possible opcodes belonging to the floating-point instruction type. This operation is illustrated as a logical ANDing of the input opcode with the set of floating-point opcodes (e.g., blocks 110, 112, 114 and 116). A TRUE value is generated if the input opcode matches any of the possible floating-point opcodes, and is illustrated as a logical ORing in FIG. 5 (e.g., block 118).

Figure 6:
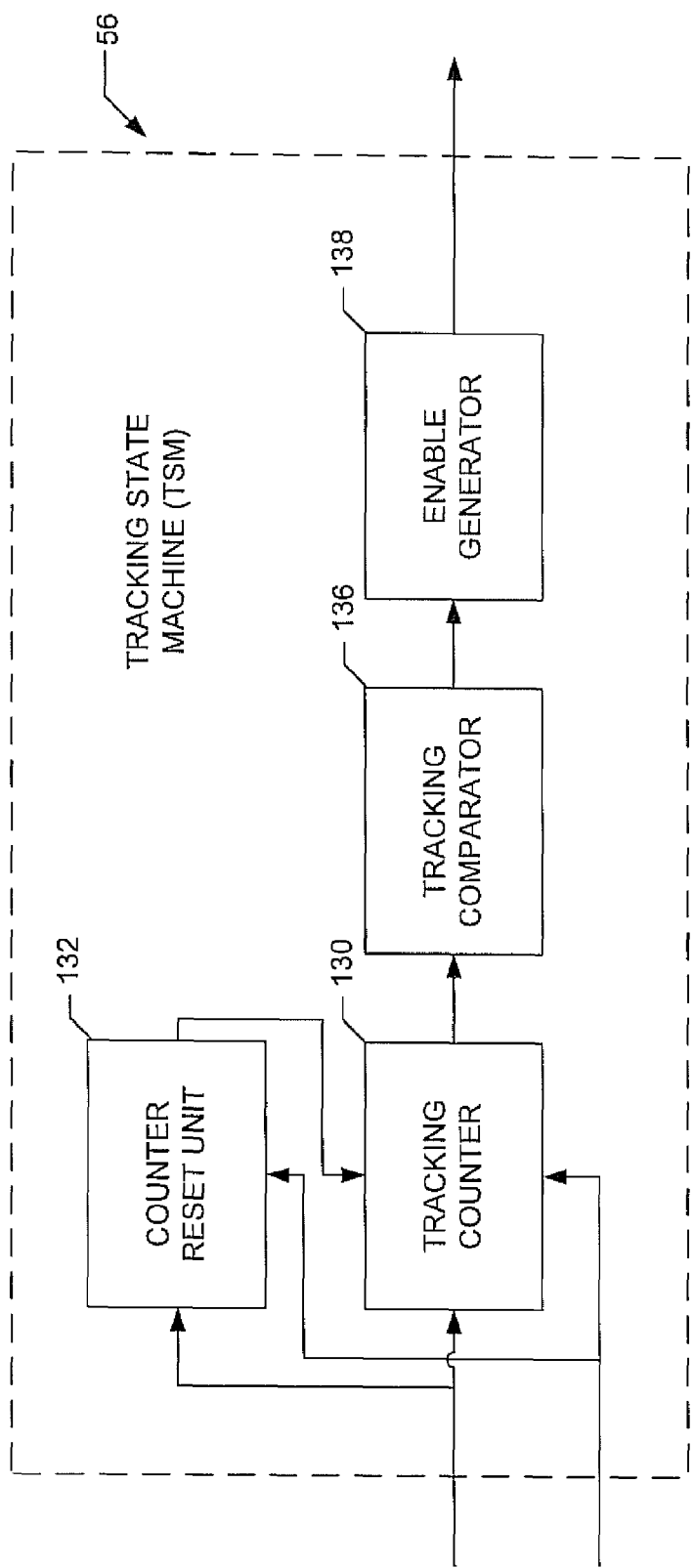
FIG. 6 is a more detailed illustration of the example tracking state machine (TSM) of FIG. 2.

To better understand the operation of the tracking state machine 56 of FIG. 2, consider the more detailed schematic illustration of an example tracking state machine 56 as shown in FIG. 6. In this example, the tracking state machine 56 comprises a tracking counter 130 whose value determines whether the power controller 50 should enable or disable the corresponding set of functional blocks 62. The value of the tracking counter 130 is modified based on the output of the instruction classifier 54 as described below. The tracking counter 130 is further controlled by a counter reset unit 132 that resets the tracking counter 130 to a first predetermined value upon startup or if a reset of the tracking state machine 56 is needed. The counter reset unit 132 also sets the tracking counter 130 to a second predetermined value if the instruction classifier 54 indicates that the instruction belongs to the type to be controlled by the tracking state machine 56.

In an example tracking state machine 56, the tracking counter 130 may be reset to zero by the counter reset unit 132 upon startup. Then, each time the instruction classifier 54 outputs a new instruction type (as indicated by its activity signal or, equivalently, by the allocation of the instruction to the instruction retirement unit 44), the value of the tracking counter 130 is modified in one of two ways. If the instruction type matches the type being controlled by the tracking state machine 56, the counter reset unit 132 sets (or loads) the tracking counter with a value representative of the processor size (for example, a value greater than or equal to the processor size). If the instruction type does not match the type being controlled by the tracking state machine 56, the tracking counter 130 decrements its value by one. Typically, the processor size is the number of instructions that can be tracked by the instruction retirement unit 44, i.e., the total number of instructions that can be allocated to the processor 12 for processing at any given time.

In the example tracking state machine 56, the value of the tracking counter 130 is compared to a threshold by a tracking comparator 136. For the example tracking counter 130 described above, the tracking comparator 136 determines if the tracking counter 130 is greater than or equal to zero. Based on the operation described above, one having ordinary skill in the art will recognize that a value of zero corresponds to the case when no instructions of the desired type are being processed at the present time by the processor 12 (e.g., the tracking counter 130 has either been reset, or the processor 12 is busy executing instructions that are all not of the desired type). A value greater than zero corresponds to the case when at least one instruction of the desired type may be under execution by the processor 12 (e.g., either an instruction of the desired type has just been allocated for execution, or there have not yet been a sufficient number of instructions read of the non-desired type to completely utilize the resources of the instruction retirement unit 44).

Therefore, the output of the tracking comparator 136 can be used by an enable generator 138 to generate the appropriate clock control signal or signals. In the example described above, if the tracking comparator 136 determines that the tracking counter 130 is equal to zero, then the enable generator 138 sets the clock control output to a logic OFF value, thereby disabling the set of functional blocks 62 coupled to the power controller 50. Conversely, if the tracking comparator 136 determines that the tracking counter 130 is greater than zero, then the enable generator 138 sets the clock control output to a logic ON value, thereby enabling the set of functional blocks 62 coupled to the power controller 50.

To further clarify the operation of the instruction classifier 54 and tracking state machine 56 for an example floating-point power controller 52, consider the table provided in FIG. 7 that illustrates an example sequence of operation. In this example, the processor size is four instructions (a very small value for illustrative purposes), and the defined instruction types are integer, floating-point and data transfer (xfer). Operation begins with the tracking counter 130 equal to zero and the output of the enable generator 138 set equal to OFF, e.g., equivalent to a reset state. A MOV instruction of the data transfer type is allocated to the instruction retirement unit 44. The instruction classifier 54 determines that the instruction is not of the floating-point type, and sets its output to FALSE. The value of the tracking counter 130 remains zero because the counter cannot be decremented to a value less than zero, and the enable generator 138 output remains set to OFF.

Next, an FADD instruction is allocated to the instruction retirement unit 44. The instruction classifier 54 determines that FADD is of the floating-point type, and therefore sets its output to TRUE. Upon seeing a TRUE input, the counter reset unit 132 resets the tracking counter 130 to four (the processor size). The tracking comparator 136 determines that the tracking counter 130 is greater than zero, and thus the enable generator 138 sets its output to ON, thereby enabling the set of floating-point functional blocks 64.

The next instruction allocated to the instruction retirement unit 44 is another MOV instruction. As the MOV instruction is not a floating-point type, the output of the instruction classifier 54 is FALSE, causing the tracking counter 130 to decrement by one to become a value of three. Because the value of the tracking counter 130 is still greater than zero, the output of the enable generator 138 remains set to ON.

The following instruction allocated to the instruction retirement unit 44 is FMUL, another floating-point instruction. Thus, a similar sequence of operations occurs as for the FADD instruction described previously. Namely. The tracking counter is reset to four and the enable output remains ON.

Next, four instructions are allocated to the instruction retirement unit 44 that are not of the floating-point type (MOV, ADD, MOV, SUB). For these instructions, the output of the instruction classifier 54 is set to FALSE, thereby causing the tracking counter 130 to decrement from four down to zero. When the value reaches zero, the enable generator 138 changes its output to OFF, thereby disabling the set of floating-point functional blocks 64. At this point it can be seen that all non-floating-point instructions have been allocated to the instruction retirement unit 44, therefore allowing the power controller to infer that no floating-point instructions are being processed by the processor 12 at this time.

The following two instructions allocated to the instruction retirement unit 44 are also non-floating-point instructions (MOV, ADD). Therefore, the output of the enable generator 138 remains OFF. The last instruction allocated is FDIV, which is a floating-point instruction, thereby causing the tracking counter value to be reset to four and the output of the enable generator 138 to switch back to ON.

Figure 8:
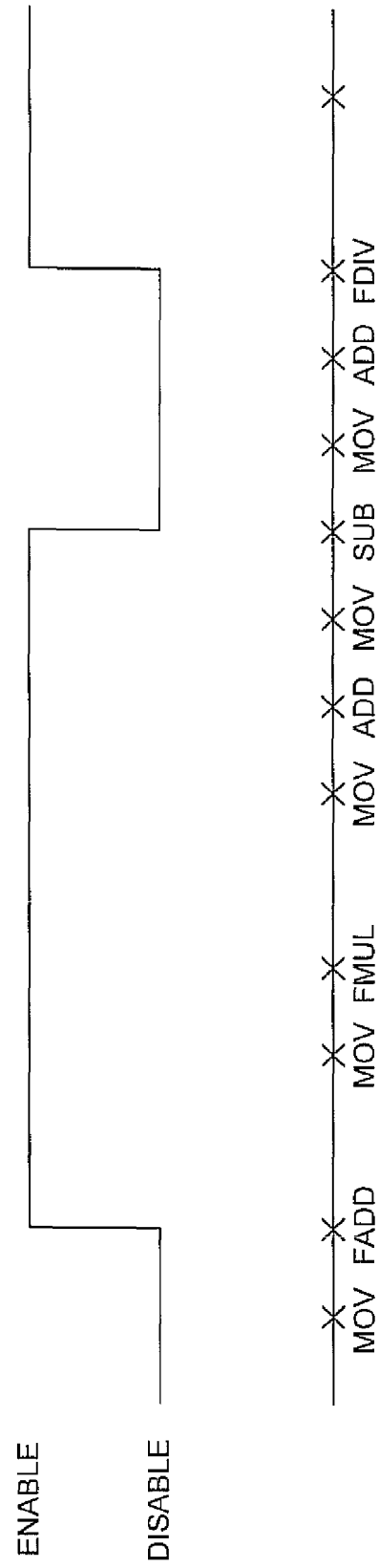
FIG. 8 is an example timing diagram corresponding to the example operation depicted in FIG. 7.

FIG. 8 depicts an example timing diagram for the clock control signal 92 output from the floating-point power controller 52 of FIG. 3. This timing diagram corresponds to the example operation illustrated in FIG. 7. As expected, the clock control output is set to enable whenever the output of the enable generator 138 is set to ON. Moreover, the diagram in FIG. 8 shows that the duration of the enable signal and the disable signal is a function not only of the order of the instructions allocated to the instruction retirement unit 44, but also the length of time that elapses between the allocation of each instruction. Fortunately, this elapsed time is included implicitly in the control signal provided by the resource allocation unit 48 as input into the activity detector 106 of the instruction classifier 54. (Note that the elapsed time between the allocation and the retirement of an instruction is also implicitly included in the control signal because the instruction retirement unit 44 cannot be allocated new instructions unless it has resources available.) Thus, the tracking state machine 56 is ensured of generating a clock control signal of the appropriate value and duration.

Figure 9A:
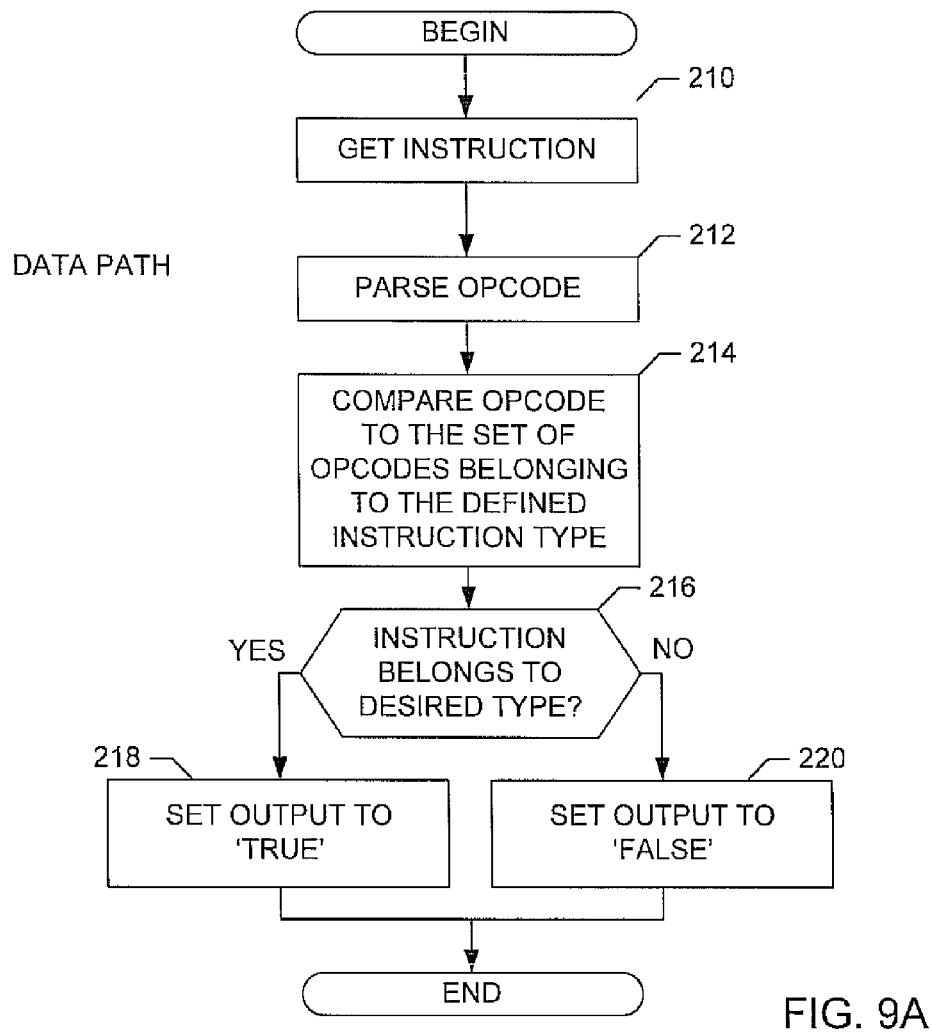
FIGS. 9A-9B are flowcharts representative of an example process which may be executed by the instruction classifier of the example power controller of FIG. 2.
Figure 9B:
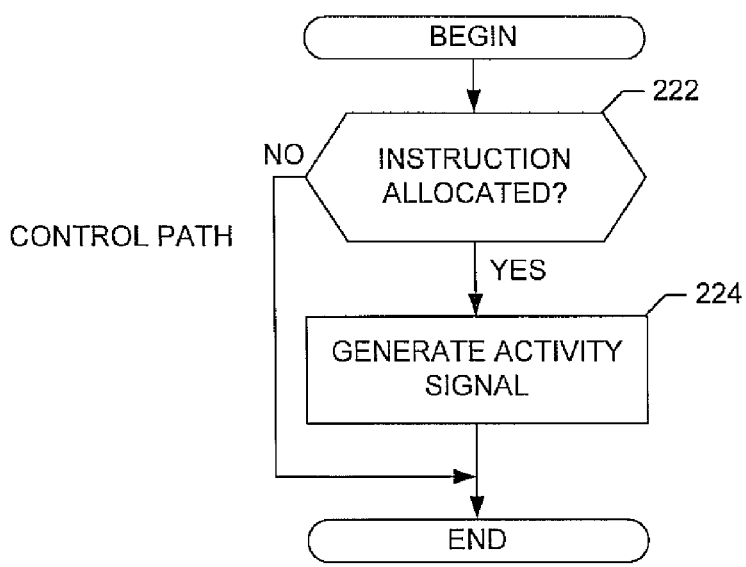
Figure 10:
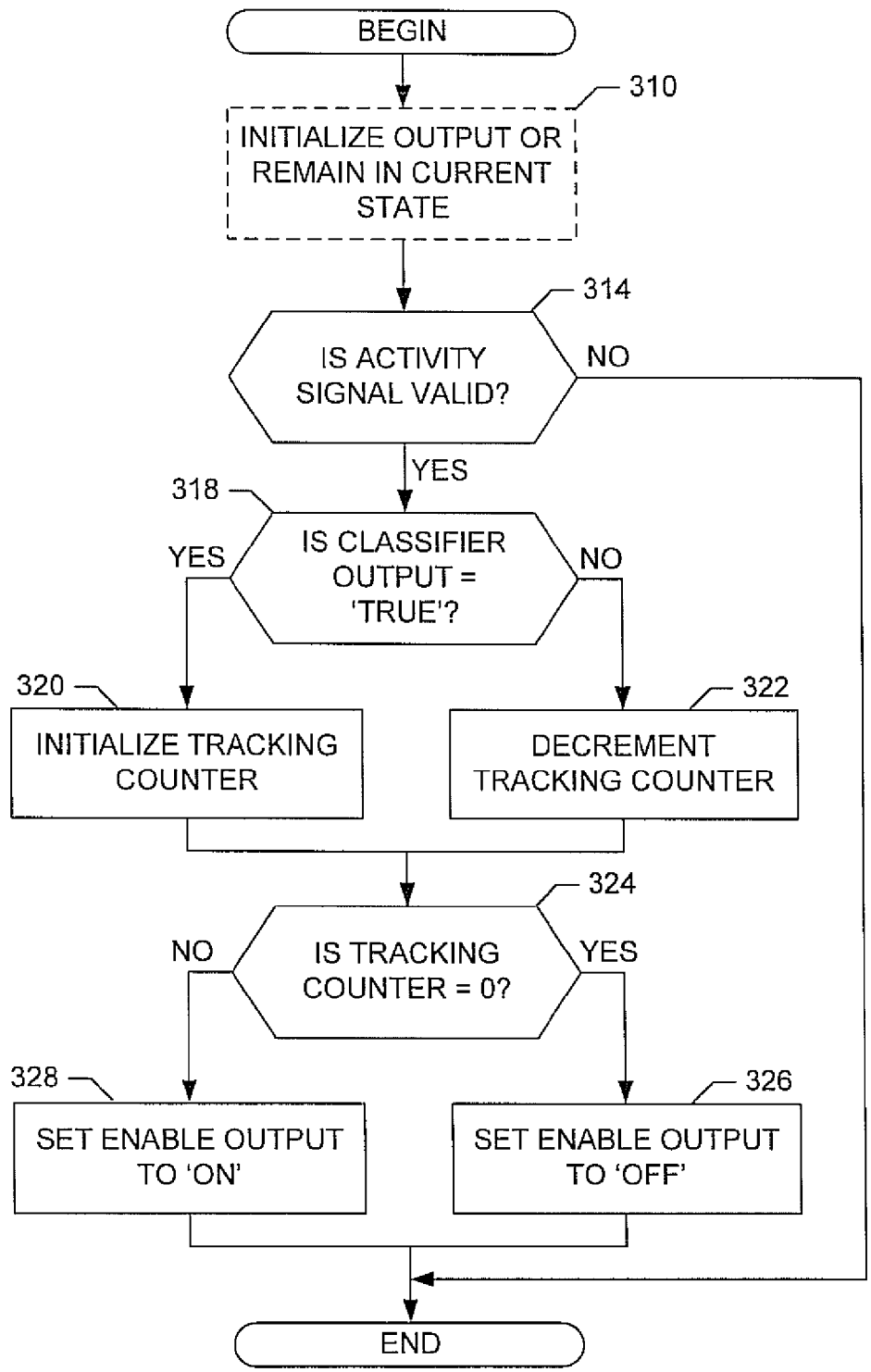
FIG. 10 is a flowchart representative of an example process which may be executed by the tracking state machine of the example power controller of FIG. 2.

Flowcharts representative of the operation of the power controller 50 of FIGS. 2 and 3 are shown in FIGS. 9A-9B and 10. The flowchart of FIG. 9A corresponds to the top processing chain in FIG. 4 that begins with an instruction being stored in the instruction register 100 and culminates with the type decoder 104 generating an output corresponding to the instruction type. The allocation of an instruction to the instruction retirement unit 44 by the resource allocation unit 48 triggers the process of FIG. 9A to begin at block 210 wherein the instruction is read from the instruction register 100 and passed to the opcode parser 102. The opcode parser 102 then parses out the opcode of the instruction (block 212).

The type decoder 104 then compares the parsed opcode with all opcodes belonging to the desired instruction type (block 214).

If the opcode belongs to the set of opcodes in the desired instruction type (block 216), then the type decoder 104 sets the output of the instruction classifier 54 to TRUE (block 218) and the process of FIG. 9A terminates. If the opcode does not belong to the set of opcodes in the desired instruction type (block 216), then the type decoder 104 sets the output of the instruction classifier 54 to FALSE (block 220) and the process of FIG. 9A terminates.

The flowchart of FIG. 9B corresponds to the bottom processing chain in FIG. 4 that includes the activity detector 106. The process of FIG. 9B begins at block 222, and the complete process is executed at regular intervals, nominally with a rate no less frequent than the maximum frequency at which instructions may be allocated to the instruction retirement unit 44. At block 222, the activity detector 106 samples its input from the resource allocation unit 48 to determine if a new instruction has been allocated to the instruction retirement unit 44 and needs to be processed. If a new instruction has been allocated (block 222), then the activity detector 106 generates an activity signal at its output (block 224) and the process of FIG. 9B terminates. If a new instruction has not been read (block 210), then the process of FIG. 9B terminates, thereby causing no change to the output of the activity detector 106. The output of the activity generator 106 remains at its current value until the next time the process of FIG. 9B is started, at which point the output is reset. Thus, in this example, the activity signal is a pulse that occurs if a new instruction is allocated to the instruction retirement unit 44.

An example process executed by the tracking state machine 56 is shown in FIG. 10. The process of FIG. 10 begins at block 310, and the complete process is executed at regular intervals, nominally with a rate no less frequent than the maximum frequency at which instructions may be allocated to the instruction retirement unit 44. At block 310, the clock control output of the tracking state machine 310 is initialized to OFF if this is the first time the process of FIG. 10 is executed, or remains at its previous value if the process has already been executed at least once, and then control passes to block 314.

If the activity signal from the instruction classifier 54 is valid (block 314) then the tracking counter 130 and the counter reset unit 132 sample the output from the type decoder 104 of the instruction classifier 54 (block 318). If the type output is set to TRUE (block 318), then the counter reset unit 132 initializes the tracking counter 130 to a value representative of the processor size, for example, a value equal to or greater than the number of instructions that can be tracked by the instruction retirement unit 44 (block 320). Control then passes to block 324.

If the type output from the type decoder 104 is set to FALSE (block 318), then the tracking counter 130 decrements its value by one (block 322). Note that in this example, the minimum value of the tracking counter 130 is zero, i.e., the tracking counter 130 will not decrement below this value. Control then passes to block 324.

At block 324, the tracking comparator 136 compares the value of the tracking counter 130 to zero. If the tracking counter is equal to zero (block 324), then the enable generator 138 sets its output to a logic OFF value (block 326), thereby causing the clock control output of the tracking state machine 56 to be set to disable the associated set of functional blocks 62, for example. The process of FIG. 10 then terminates.

If the tracking counter 130 is greater than zero (block 324), then the enable generator 138 sets its output to a logic ON value (block 328), thereby), thereby causing the clock control output of the tracking state machine 56 to be set to enable the associated set of functional blocks 62, for example. The process of FIG. 10 then terminates.

If the activity signal from the instruction classifier 54 is not valid (block 314), then there is no new instruction to process and the process of FIG. 10 terminates.

One having ordinary skill in the art will recognize that the example tracking state machine 56 and the associated example process of FIG. 10 can also be implemented to yield an equivalent operation but with a tracking counter 130 that increments rather than decrements. For example, the internal operation of the tracking state machine 56 could be modified as follows. The counter reset unit 132 could reset the tracking counter 130 to a value representative of the processor size upon reset of the tracking state machine 56. The counter reset unit 132 could set the tracking counter 130 to zero if the output of the instruction classifier 54 indicates that the instruction is of the desired type. The tracking counter 130 could increment instead of decrement if the instruction classifier 54 indicates that the instruction is not of the desired type. The tracking comparator 136 could determine if the value of the tracking counter 130 is less than the value representative of the processor size. If the tracking counter 130 is less than this value, then the enable generator 138 could set its output to a logic ON value. Otherwise, the enable generator 138 could set its output to a logic OFF value. Therefore, while the operation of its constituent components can be redefined, the overall operation of the tracking state machine 56 remains unchanged.

One having ordinary skill in the art will also recognize that the example power controller 50 described herein can be applied to single-processor and multi-processor systems as well. For example, the power controller 50 could be implemented as a stand-alone controller, rather than integrated into a given processor, and could be coupled with a memory to store instructions to be processed by the processor system. Using the methods and or apparatus described herein, the power controller 50 could then enable and disable sets of functional blocks within a processor or a set of processors in the processor system based on the instructions being processed. Alternatively or additionally, the stand-alone controller 50 could enable and disable a processor or a set of processors in the processor system based on the instructions being processed.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. A processor comprising:
   an instruction classifier logic to identify an instruction type of an instruction in response to receiving the instruction, wherein the instruction classifier is to include an opcode parser and a type detector, wherein the opcode parser is to determine an opcode component of the instruction and the type decoder is to generate a signal representative of a type of the instruction in response to receiving the opcode component;
   a tracking state machine coupled to the instruction classifier, wherein the tracking state machine is to include a tracking counter and a tracking comparator, wherein a counter value in the tracking counter is set to a maximum count value if the type of the instruction received is the same as a type being tracked by the tracking state machine, wherein the tracking comparator is to generate control signals, a power controller coupled to the tracking state machine, wherein the power controller is to enable or disable one or more processing logic based on the control signals;

a processing logic, of the one or more processing logic, to be enabled or disabled by the power controller; and an instruction retirement unit to determine the maximum count value based on a maximum number of instructions that can be tracked by the instruction retirement unit.

2. The processor as defined in claim 1, wherein the counter value is decremented if the type of the instruction received is not the same as the type being tracked by the tracking machine.

3. The processor as defined in claim 1, wherein the power controller is to disable at least one functional block when the counter value is zero.

4. The processor as defined in claim 1, wherein the processing logic is associated with a pipeline, the pipeline the functional block associated with the instruction type.

5. The processor as defined in claim 4, wherein the functional block comprises at least one of an integer instruction type or a float instruction type.

6. A method to control pipeline processing comprises:
receiving an instruction in a pipeline;
identifying an instruction type of an instruction in response to receiving the instruction, wherein identifying the instruction type includes determining an opcode component of the instruction and generating a signal representative of a type of the instruction based on the opcode component;
determining a maximum count value based on a maximum number of instructions that can be tracked by an instruction retirement unit;
setting a counter value to the maximum count value in a tracking counter, wherein the counter value is set to the maximum count value if the type of the instruction received is the same as a type being tracked by the tracking state machine, wherein a tracking comparator is to generate control signals;
generating control signals based on the counter value; and
enabling or disabling the pipeline based on the control signals.

7. The method as defined in claim 6, further comprising decrementing the counter value if the instruction type is not the same as the type being tracked.

8. The method as defined in claim 6, wherein the instruction type comprises at least one of an integer instruction type or a float instruction type.

9. The method as defined in claim 6 further comprises enabling or disabling, of at least, a portion of the pipeline.

10. The method as defined in claim 9, wherein the portion of the pipeline comprises at least one of an integer functional block or a float functional block.

11. The method as defined in claim 9, wherein the portion of the pipeline is disabled when the counter value is zero.

12. An article of manufacturing storing machine readable instructions which, when executed, cause a machine to:
receive an instruction in a pipeline;
identify an instruction type of an instruction in response to receiving the instruction, wherein identifying the instruction type includes determining an opcode component of the instruction and generating a signal representative of a type of the instruction based on the opcode component;
determine a maximum count value based on a maximum number of instructions that can be tracked by an instruction retirement unit;
set a counter value to the maximum count value in a tracking counter, wherein the counter value is set to the maximum count value if the type of the instruction received is the same as a type being tracked by the tracking state machine, wherein a tracking comparator is to generate control signals;
generate control signals based on the counter value; and
enable or disable the pipeline based on the control signals.

13. An article of manufacture as defined in claim 12, wherein the machine readable instructions, when executed, cause the machine to decrement the counter value if the instruction type is not the same as the type being tracked.

14. The article of manufacture as defined in claim 12, wherein the machine readable instructions, when executed, cause the machine to enable or disable, at least, a portion of the pipeline.

15. An article of manufacture as defined in claim 14, wherein the machine readable instructions, when executed, cause the machine to disable the portion of the pipeline when the value is zero.

* * * * *